(12) United States Patent
Sherry

(10) Patent No.: US 10,671,858 B2
(45) Date of Patent: *Jun. 2, 2020

(54) SYSTEMS AND METHODS FOR LOCATING IMAGE DATA FOR SELECTED REGIONS OF INTEREST

(71) Applicant: GOOGLE LLC, Mountain View, CA (US)

(72) Inventor: Eden Sherry, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,548

(22) Filed: Oct. 9, 2018

(65) Prior Publication Data

US 2019/0042855 A1 Feb. 7, 2019

Related U.S. Application Data

(63) Continuation of application No. 15/398,634, filed on Jan. 4, 2017, now Pat. No. 10,095,933.

(60) Provisional application No. 62/430,317, filed on Dec. 5, 2016.

(51) Int. Cl.
| | |
|---|---|
| *G06K 9/00* | (2006.01) |
| *H04N 7/18* | (2006.01) |
| *H04N 21/84* | (2011.01) |
| *H04N 21/472* | (2011.01) |
| *H04N 21/4728* | (2011.01) |
| *H04N 21/6587* | (2011.01) |

(52) U.S. Cl.
CPC ...... *G06K 9/00771* (2013.01); *G06K 9/00228* (2013.01); *G06K 9/00744* (2013.01); *H04N 7/18* (2013.01); *H04N 21/4728* (2013.01); *H04N 21/47217* (2013.01); *H04N 21/6587* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 9,818,451 | B1* | 11/2017 | Tyagi | G11B 27/34 |
| 2005/0062869 | A1* | 3/2005 | Zimmermann | G02B 13/06 |
| | | | | 348/335 |
| 2009/0066795 | A1* | 3/2009 | Wollmershauser | H04N 7/181 |
| | | | | 348/159 |

(Continued)

*Primary Examiner* — Reza Aghevli
(74) *Attorney, Agent, or Firm* — Morgan, Lewis & Bockius LLP

(57) ABSTRACT

A server system obtains a first video sub-stream comprising a first plurality of images of a scene and obtains a second video sub-stream comprising a second plurality of images of at least a portion of the scene. Images of the second video sub-stream have a higher image resolution than images of the first video sub-stream. The first video sub-stream is transmitted to a client device for display. A selection of a region of interest in the scene is received, wherein the selection is from a first image of the first plurality of images of the first video sub-stream. The server systems locates image data of the selected region of interest from the second plurality of images, and provides the located image data of the selected region of interest to the client device for display.

20 Claims, 15 Drawing Sheets

(56) References Cited

U.S. PATENT DOCUMENTS

| | | | |
|---|---|---|---|
| 2013/0166711 A1* | 6/2013 | Wang | H04N 7/181 709/223 |
| 2013/0330055 A1* | 12/2013 | Zimmermann | G06F 16/78 386/240 |
| 2014/0281012 A1* | 9/2014 | Troxler | H04L 67/2804 709/231 |
| 2014/0293048 A1* | 10/2014 | Titus | G08B 13/19608 348/143 |
| 2015/0199366 A1* | 7/2015 | Marlatt | G06F 16/183 707/823 |
| 2015/0201198 A1* | 7/2015 | Marlatt | H04N 19/124 375/240.03 |

* cited by examiner

SYSTEMS AND METHODS FOR LOCATING IMAGE DATA FOR SELECTED REGIONS OF INTEREST

RELATED APPLICATIONS

This application is a continuation of U.S. patent application Ser. No. 15/398,634, filed Jan. 4, 2017, which claims priority to U.S. Provisional Application No. 62/430,317, filed Dec. 5, 2016, all of which are hereby incorporated by reference in their entirety.

TECHNICAL FIELD

The disclosed implementations relates generally to video monitoring, including, but not limited, to locating higher-resolution image data for selected regions of interest.

BACKGROUND

Video surveillance produces a large amount of continuous video data over the course of hours, days, and even months. In order for a video surveillance system to provide continuous video data without exceeding its network bandwidth and processing constraints, video data is sometimes streamed at an image resolution that is lower than the maximum device capabilities of the system. While continuous footage may be available in such implementations, it is often achieved at the expense of image clarity.

SUMMARY

Accordingly, there is a need for methods, devices, and systems for locating higher-resolution image data for selected regions of interest. In various implementations, the disclosed functionality complements or replaces the functionality of video surveillance systems.

In some implementations, a method is performed at a server system having one or more processors and memory storing instructions for execution by the one or more processors. The method includes obtaining a first video sub-stream comprising a first plurality of images of a scene and obtaining a second video sub-stream comprising a second plurality of images of at least a portion of the scene, wherein images of the second video sub-stream have a higher image resolution than images of the first video sub-stream. The first video sub-stream is transmitted to a client device for display. A selection of a region of interest in the scene is received, wherein the selection is from a first image of the first plurality of images of the first video sub-stream, the first image having a first timestamp. Based on the first timestamp, the method includes locating, from the second plurality of images of the second video sub-stream, image data of the selected region of interest, and providing the located image data of the selected region of interest to the client device for display.

In some implementations, a method is performed at a client device (e.g., a smartphone) having one or more processors and memory storing instructions for execution by the one or more processors. The method includes receiving, from a server system, a first video sub-stream comprising a first plurality of images of a scene, and playing the first video sub-stream. Selection of a region of interest in the scene is detected, wherein the selection is from a first image of the first plurality of images of the first video sub-stream, the first image having a first timestamp. The selected region of interest is transmitted to the server system. The method further includes receiving, from the server system, image data of the selected region of interest, wherein the image data is located from a second plurality of images of a second video sub-stream based on the first timestamp. Images of the second video sub-stream have a higher image resolution than images of the first video sub-stream. The method then includes displaying the located image data.

In accordance with some implementations, a server system (and/or a client device) includes one or more processors, memory, and one or more programs. The one or more programs are stored in the memory and configured to be executed by the one or more processors. The one or more programs include instructions for performing the operations of any of the methods described above. In accordance with some implementations, a non-transitory computer-readable storage medium has stored therein instructions that, when executed by the server system (and/or the client device), cause the computer system (and/or the client device) to perform the operations of any of the methods described above.

Thus, computing systems and devices are provided with more efficient methods for locating higher-resolution image data for selected regions of interest. These disclosed systems and devices thereby increase the effectiveness, efficiency, and user satisfaction with such systems and devices.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Figure 1:
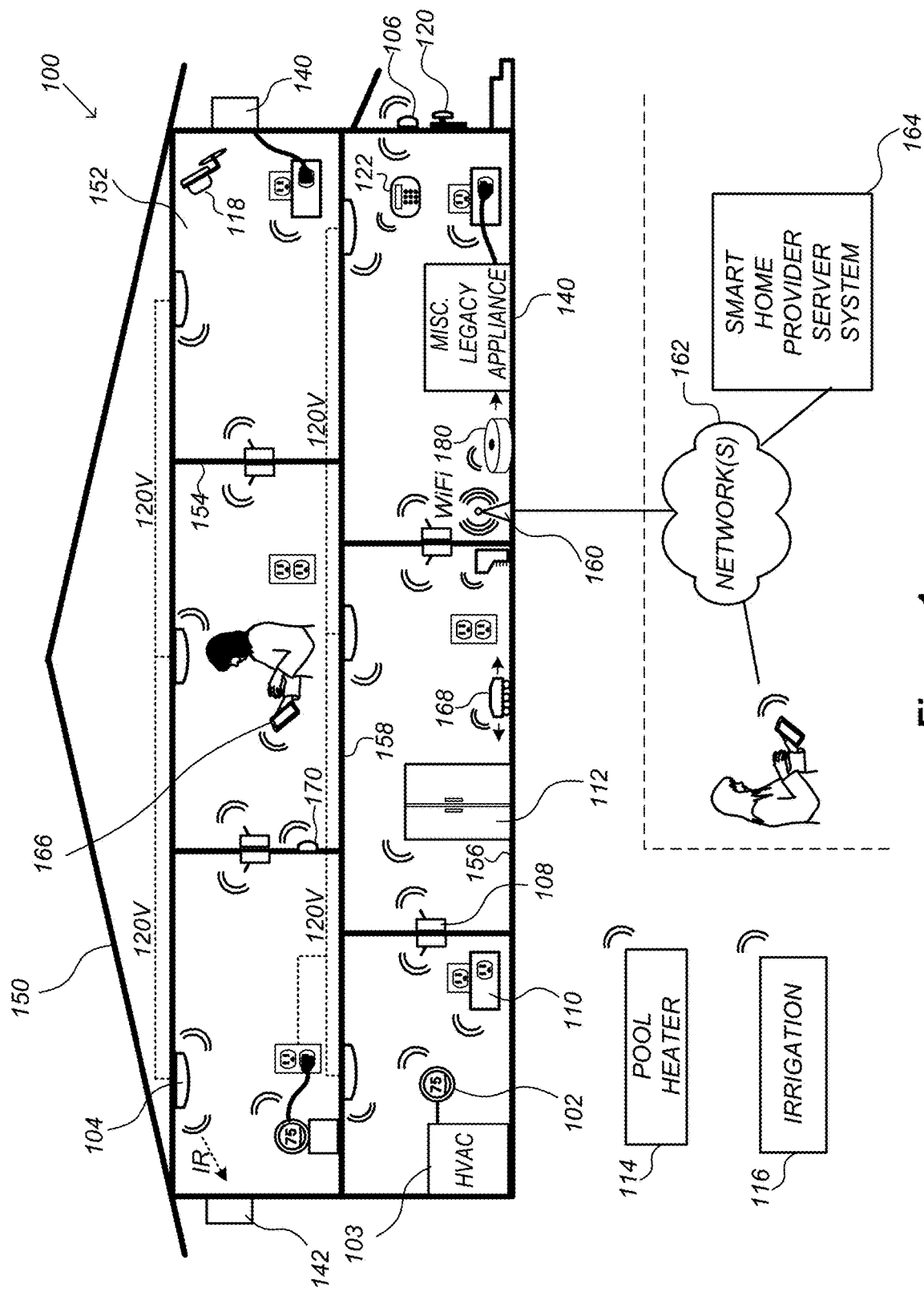
FIG. 1 is a representative smart home environment in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions (collectively referred to as "smart devices"). The smart home environment 100 may include one or more smart devices, such as one or more intelligent, multi-sensing, network-connected: thermostats 102 (hereinafter referred to as "smart thermostats 102"), hazard detection units 104 (hereinafter referred to as "smart hazard detectors 104"), entryway interface devices 106 and 120 (hereinafter referred to as "smart doorbells 106" and "smart door locks 120"), alarm systems 122 (hereinafter referred to as "smart alarm systems 122"), wall switches 108 (hereinafter referred to as "smart wall switches 108"), wall plugs 110 (hereinafter referred to as "smart wall plugs 110"), appliances 112 (hereinafter referred to as "smart appliances 112"), cameras 118, and hub devices 180.

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. Smart wall plugs 110 control supply of power to one or more coupled devices. Smart wall plugs 110 control access to power based on sensor readings (e.g., power is not supplied to a coupled device if no users are present, based on a detected occupancy of a room) or remote control inputs (e.g., inputs received from a client device 504).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152).

Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more devices having an occupancy sensor (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, data communications are conducted peer-to-peer (e.g., by establishing direct wireless communications channels between devices). In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). In some implementations, the smart home provider server system 164 may include multiple server systems each dedicated to data processing associated with a respective subset of the smart devices (e.g., a video server system may be dedicated to data processing associated with camera(s) 118). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
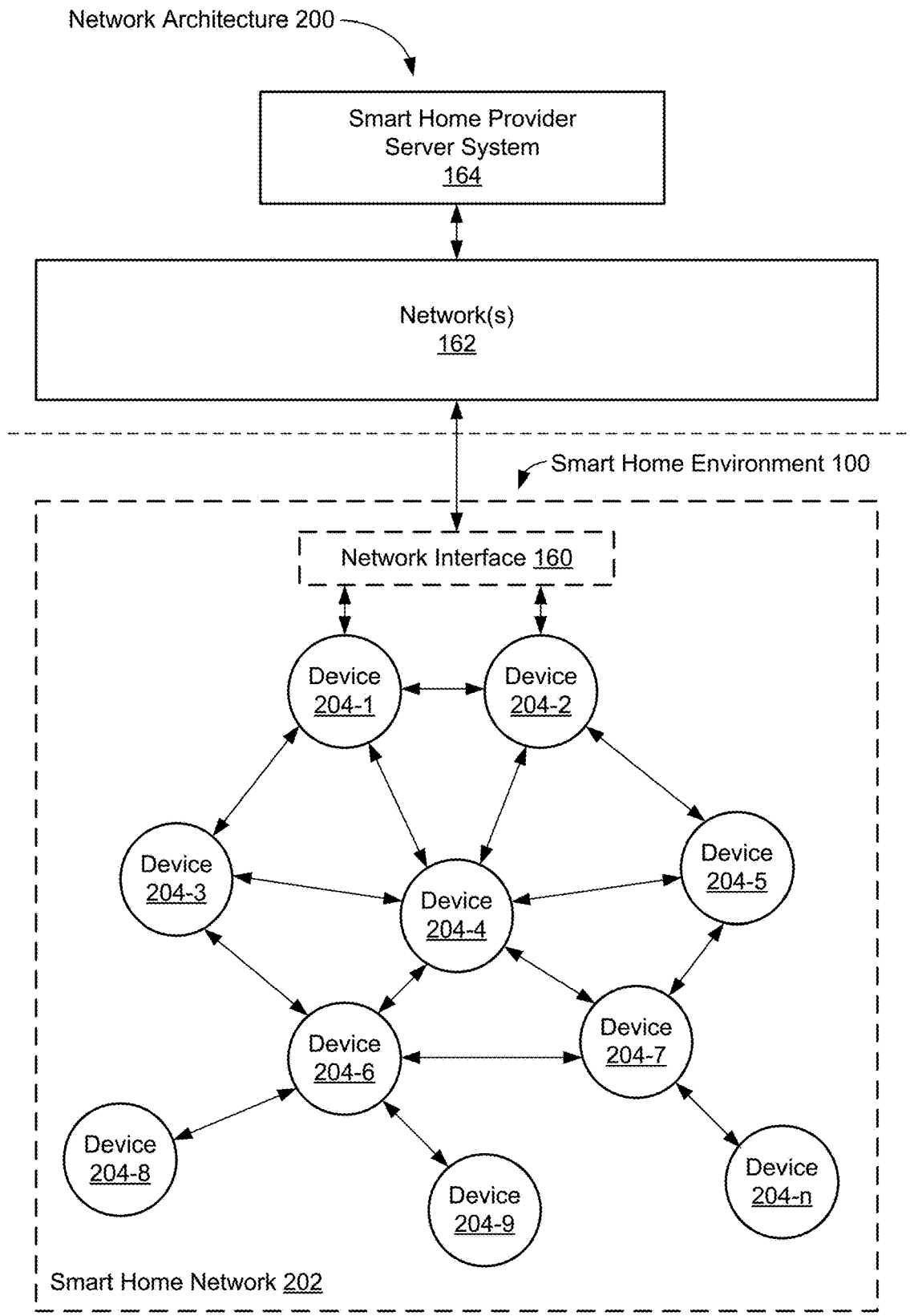
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, 118, 180, and/or 122) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone) to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

Figure 3:
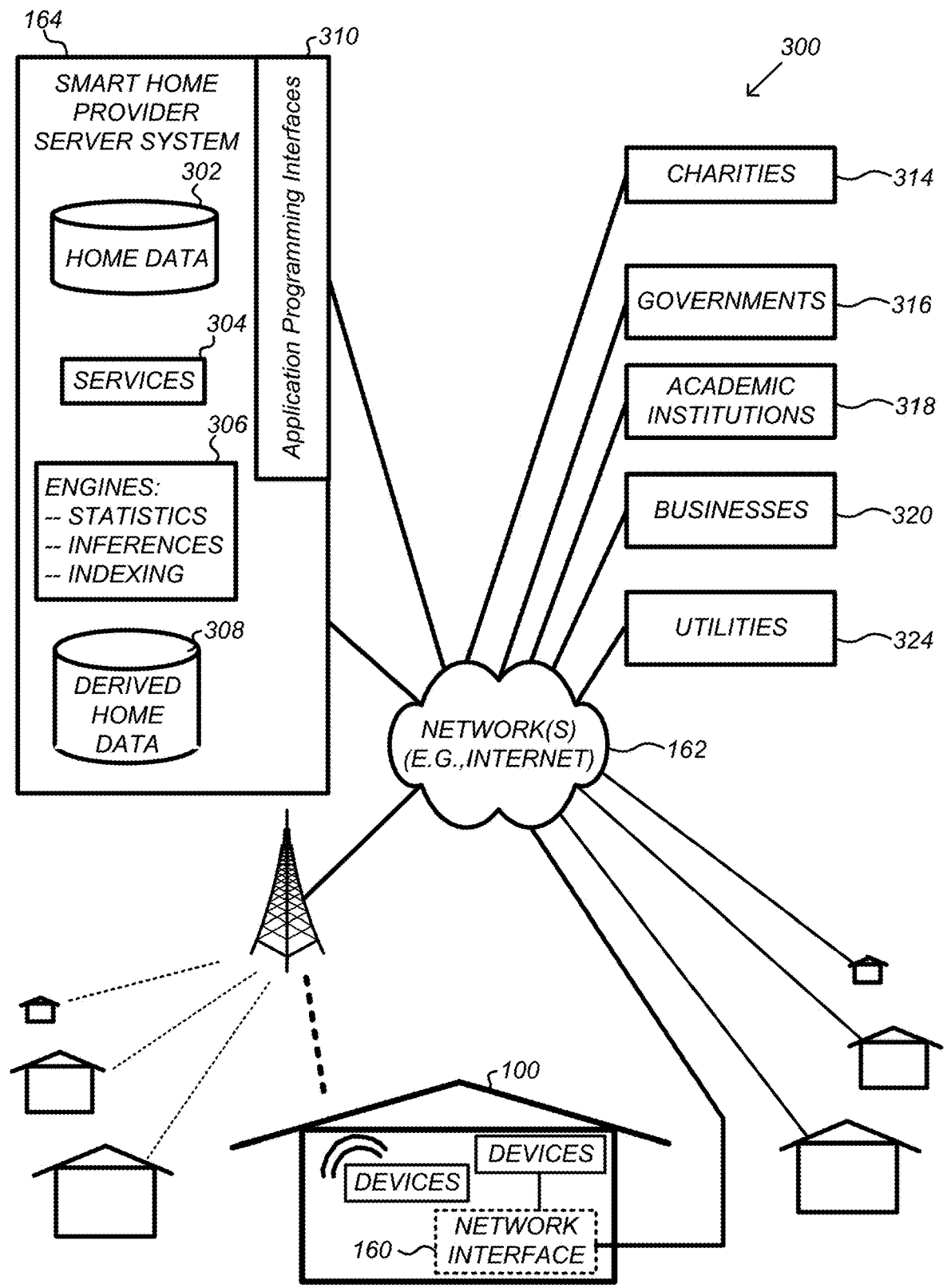
FIG. 3 illustrates a network-level view of an extensible platform for devices and services, which may be integrated with the smart home environment of FIG. 1 in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices (e.g., 102, 104, 106, 108, 110, 112, 114, 116, 118, etc.) from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302).

Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature and humidity data, television viewership data, inside and outside noise level data, pressure data, video data, etc.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and the services platform 300 includes a processing engine 306, which may be concentrated at a single server or distributed among several different computing entities. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
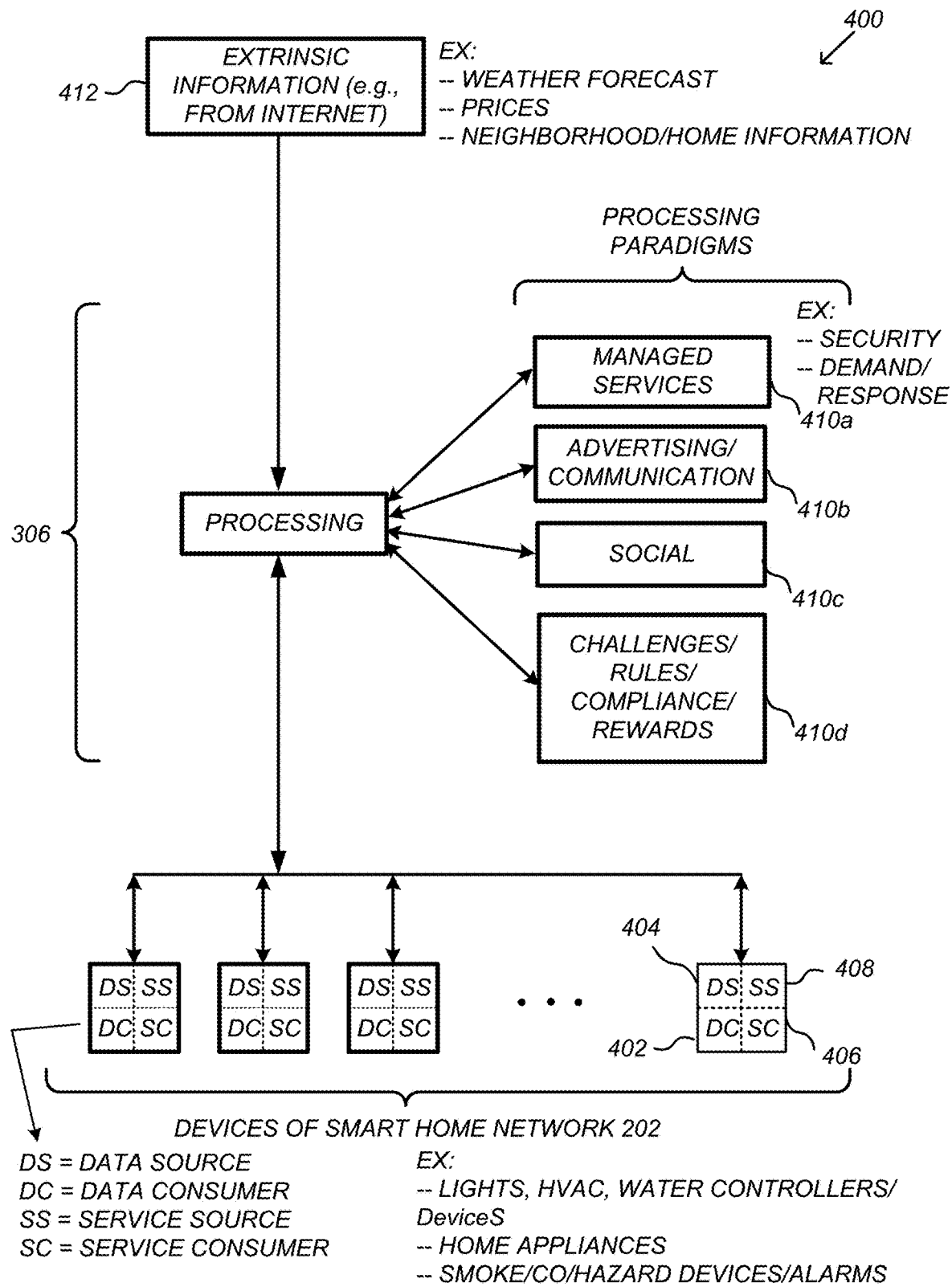
FIG. 4 illustrates an abstracted functional view of the extensible platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows the processing engine 306 as including a number of processing paradigms 410. In some implementations, the processing engine 306 includes a managed services paradigm 410*a* that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410*b* that estimates characteristics (e.g., demographic information), desires and/or products of interest of a user based on device usage. Services, promotions, products or upgrades may then be offered or automatically provided to the user. In some implementations, the processing engine 306 includes a social paradigm 410*c* that uses information from a social network, provides information to a social network (for example, based on device usage), and/or processes data associated with user and/or device interactions with the social network platform. For example, a user's status as reported to trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
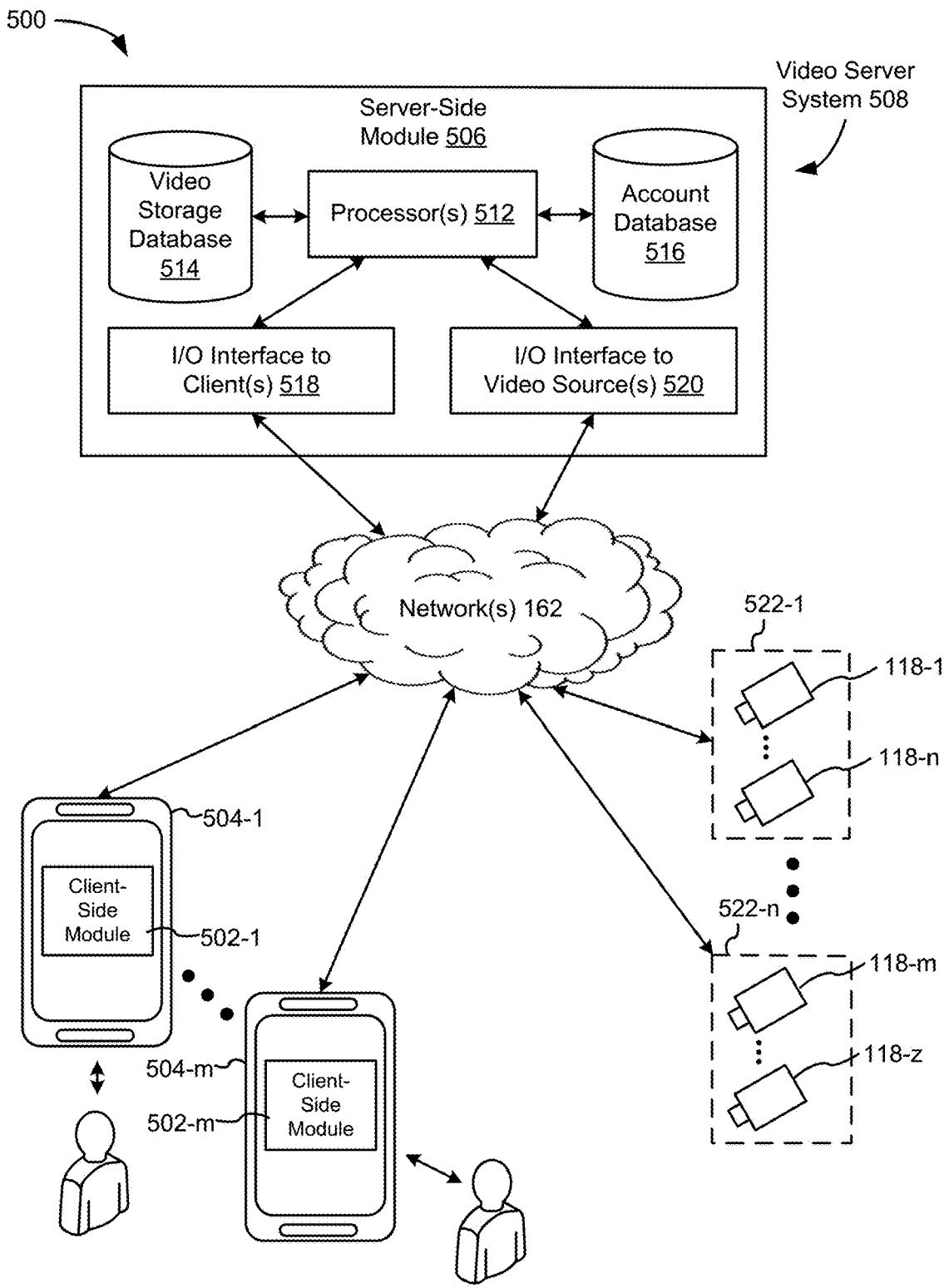
FIG. 5 is a representative operating environment in which a video server system interacts with client devices and video sources, in accordance with some implementations.

FIG. 5 illustrates a representative operating environment 500 in which a video server system 508 provides data processing for monitoring and facilitating review of motion events in video streams captured by video cameras 118. As shown in FIG. 5, the video server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the video server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 508. In some implementations, the video server system 508 is a dedicated video processing server that provides video processing services to video sources and client devices 504 independent of other services provided by the video server system 508.

In some implementations, each of the video sources 522 includes one or more video cameras 118 that capture video and send the captured video to the video server system 508 substantially in real-time. In some implementations, each of the video sources 522 includes a controller device (not shown) that serves as an intermediary between the one or more cameras 118 and the video server system 508. The controller device receives the video data from the one or more cameras 118, optionally performs some preliminary processing on the video data, and sends the video data to the video server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 508.

As shown in FIG. 5, in accordance with some implementations, each of the client devices 504 includes a client-side module 502. The client-side module 502 communicates with a server-side module 506 executed on the video server system 508 through the one or more networks 162. The client-side module 502 provides client-side functionality for the event monitoring and review processing and communications with the server-side module 506. The server-side module 506 provides server-side functionality for event monitoring and review processing for any number of client-side modules 502 each residing on a respective client device 504. The server-side module 506 also provides server-side functionality for video processing and camera control for any number of the video sources 522, including any number of control devices and the cameras 118.

In some implementations, the server-side module 506 includes one or more processors 512, a video storage database 514, an account database 516, an I/O interface to one or more client devices 518, and an I/O interface to one or more video sources 520. The I/O interface to one or more clients 518 facilitates the client-facing input and output processing for the server-side module 506. The account database 516 stores a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 508 is implemented on one or more standalone data processing apparatuses or a distributed network of computers. In some implementations, the video server system 508 also employs various virtual devices and/or services of third party service providers (e.g., third-party cloud service providers) to provide the underlying computing resources and/or infrastructure resources of the video server system 508. In some implementations, the video server system 508 includes, but is not limited to, a handheld computer, a tablet computer, a laptop computer, a desktop computer, or a combination of any two or more of these data processing devices or other data processing devices. In some implementations, the video server system 508 and the smart home provider server system 164 are implemented as a single system, which may be configured to perform any combination of features or functionalities described with respect to the two systems throughout.

The server-client environment 500 shown in FIG. 5 includes both a client-side portion (e.g., the client-side module 502) and a server-side portion (e.g., the server-side module 506). The division of functionality between the client and server portions of operating environment 500 can vary in different implementations. Similarly, the division of functionality between a video source 522 and the video server system 508 can vary in different implementations. For example, in some implementations, the client-side module 502 is a thin-client that provides only user-facing input and output processing functions, and delegates all other data processing functionality to a backend server (e.g., the video server system 508). Similarly, in some implementations, a respective one of the video sources 522 is a simple video capturing device that continuously captures and streams video data to the video server system 508 with limited or no local preliminary processing on the video data. Although many aspects of the present technology are described from the perspective of the video server system 508, the corresponding actions performed by a client device 504 and/or the video sources 522 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the video server system 508, a client device 504, and a video source 522 cooperatively.

Figure 6:
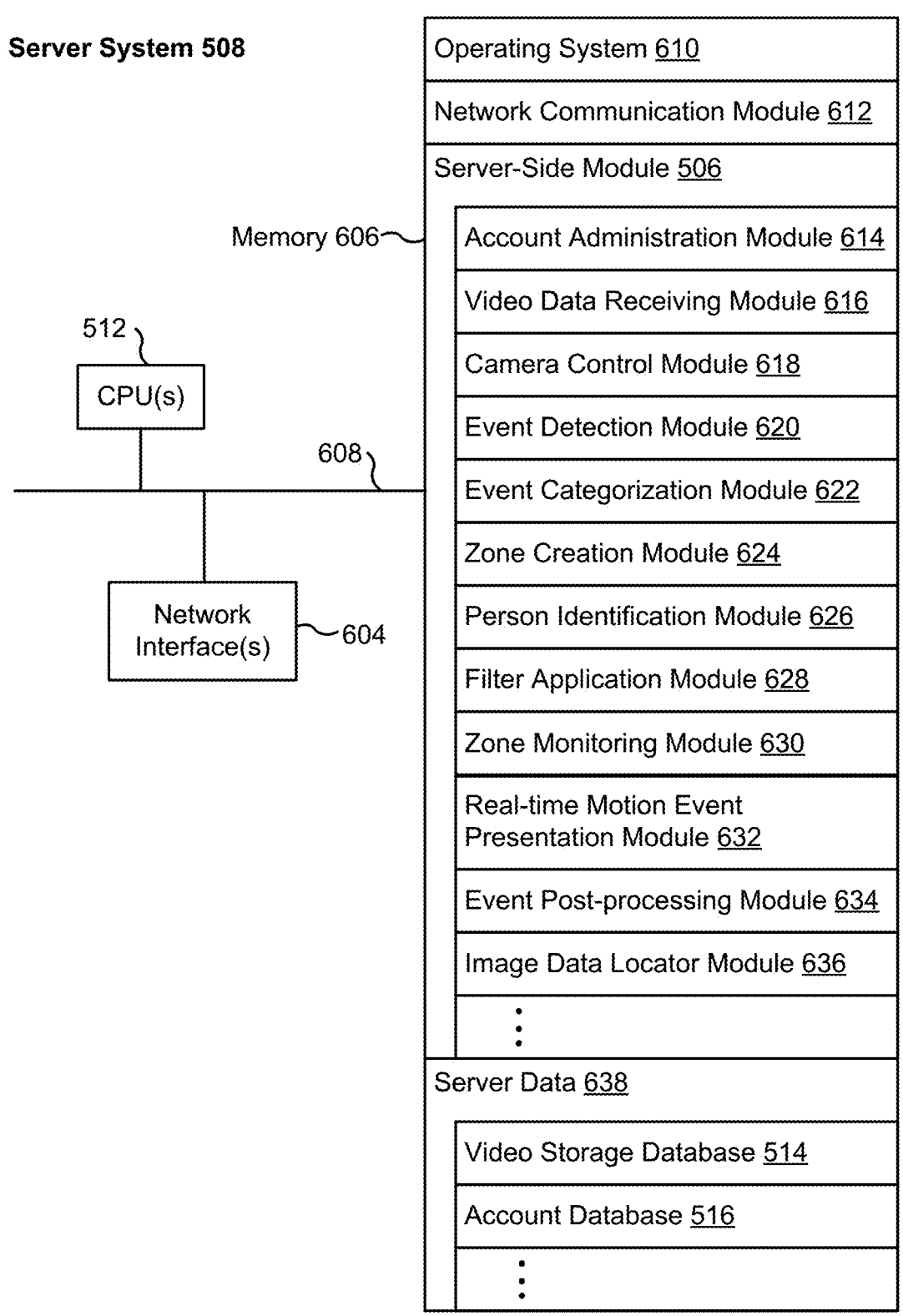
FIG. 6 is a block diagram illustrating a representative video server system, in accordance with some implementations.
Figure 9:
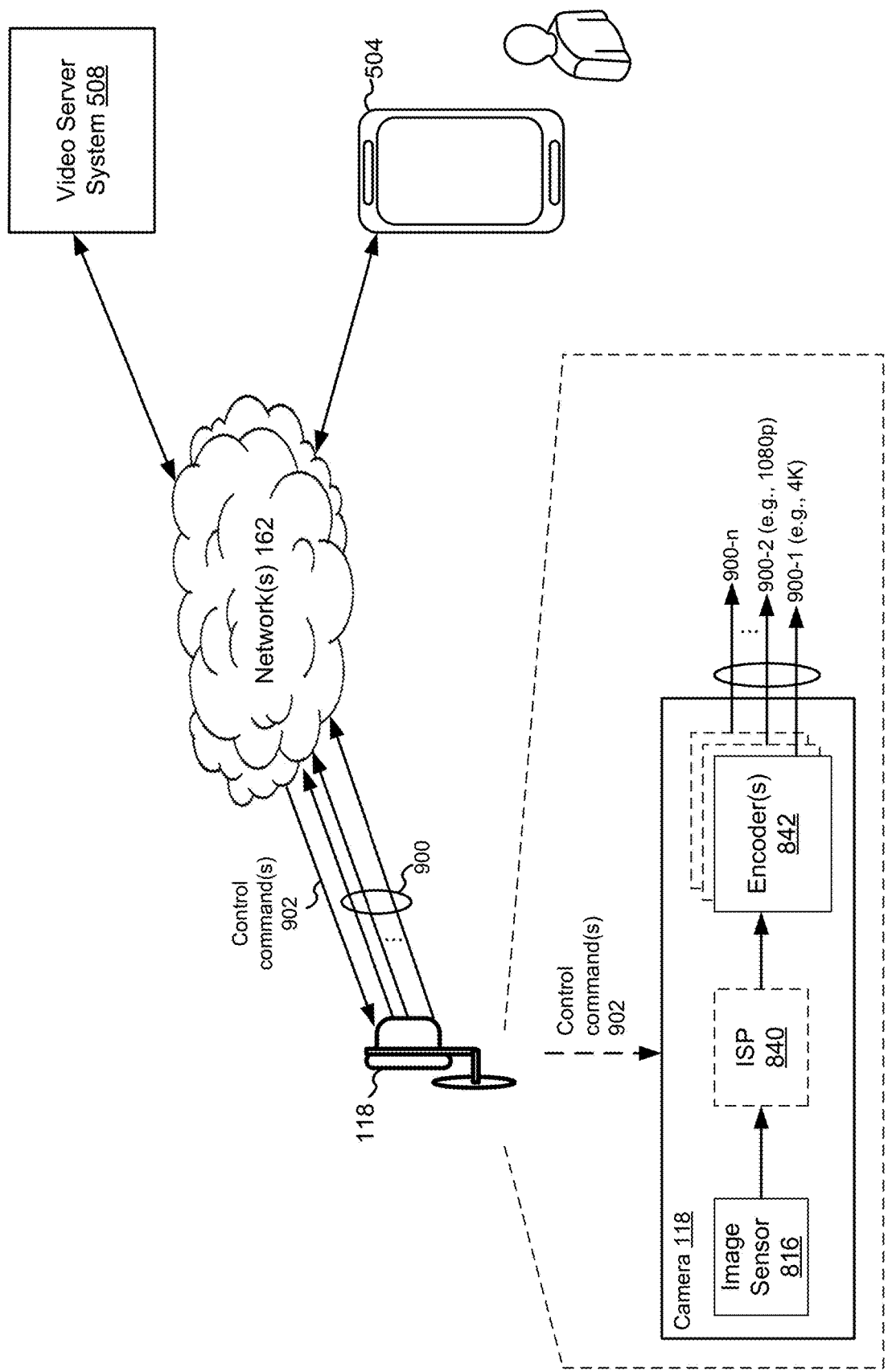
FIG. 9 is a block diagram illustrating a representative video server system and a corresponding data processing pipeline for captured image data, in accordance with some implementations.

FIG. 6 is a block diagram illustrating the video server system 508 in accordance with some implementations. The video server system 508, typically, includes one or more processing units (CPUs) 512, one or more network interfaces 604 (e.g., including the I/O interface to one or more clients 518 and the I/O interface to one or more video sources 520), memory 606, and one or more communication buses 608 for interconnecting these components (sometimes called a chipset). The memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from the one or more processing units 512. The memory 606, or alternatively the non-volatile memory within the memory 606, includes a non-transitory computer-readable storage medium. In some implementations, the memory 606, or the non-transitory computer-readable storage medium of the memory 606, stores the following programs, modules, and data structures, or a subset or superset thereof:

Operating system 610 including procedures for handling various basic system services and for performing hardware dependent tasks;

Network communication module 612 for connecting the video server system 508 to other computing devices (e.g., the client devices 504 and the video sources 522 including camera(s) 118) connected to the one or more networks 162 via the one or more network interfaces 604 (wired or wireless);

Server-side module 506, which provides server-side data processing and functionalities for the event monitoring and review, including but not limited to:

Account administration module 614 for creating reviewer accounts, performing camera registration processing to establish associations between video sources to their respective reviewer accounts, and providing account login-services to the client devices 504;

Video data receiving module 616 for receiving raw/processed image data (e.g., streams 900 having various resolutions, frame rates, encoding characteristics, etc., FIG. 9) from the video sources 522, and preparing the received video data for event processing and long-term storage in the video storage database 514;

Camera control module 618 for generating and sending server-initiated control commands to modify the operation modes of the video sources, and/or receiving and forwarding user-initiated control commands to modify the operation modes of the video sources 522;

Event detection module 620 for detecting motion event candidates in video streams from each of the video sources 522, including motion track identification, false positive suppression, and event mask generation and caching;

Event categorization module 622 for categorizing motion events detected in received video streams;

Zone creation module 624 for generating zones of interest in accordance with user input;

Person identification module 626 for identifying characteristics associated with presence of humans in the received video streams;

Filter application module 628 for selecting event filters (e.g., event categories, zones of interest, a human filter, etc.) and applying the selected event filter to past and new motion events detected in the video streams;

Zone monitoring module 630 for monitoring motions within selected zones of interest and generating notifications for new motion events detected within the selected zones of interest, where the zone monitoring takes into account changes in surrounding context of the zones and is not confined within the selected zones of interest;

Real-time motion event presentation module 632 for dynamically changing characteristics of event indicators displayed in user interfaces as new event filters, such as new event categories or new zones of interest, are created, and for providing real-time notifications as new motion events are detected in the video streams;

Event post-processing module 634 for providing summary time-lapse for past motion events detected in video streams, and providing event and category editing functions to user for revising past event categorization results; and Image data locator module 636 for locating image data for selected regions of interest (e.g., locating high-resolution images/frames from video streams 900, FIG. 9);

server data 638 storing data for use in data processing for motion event monitoring and review, including but not limited to:

Video storage database 514 storing raw/processed image data (e.g., streams 900 having various resolutions, frame rates, encoding characteristics, etc., FIG. 9) associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, DTPZ settings of the cameras 118, etc.) associated with the motion events; and Account database 516 for storing account information for reviewer accounts, including login-credentials, associated video sources, relevant user and hardware characteristics (e.g., service tier, camera model, storage capacity, processing capabilities, etc.), user interface settings, monitoring preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 606, optionally, stores a subset of the modules and data structures identified above. Furthermore, the memory 606, optionally, stores additional modules and data structures not described above.

Figure 7:
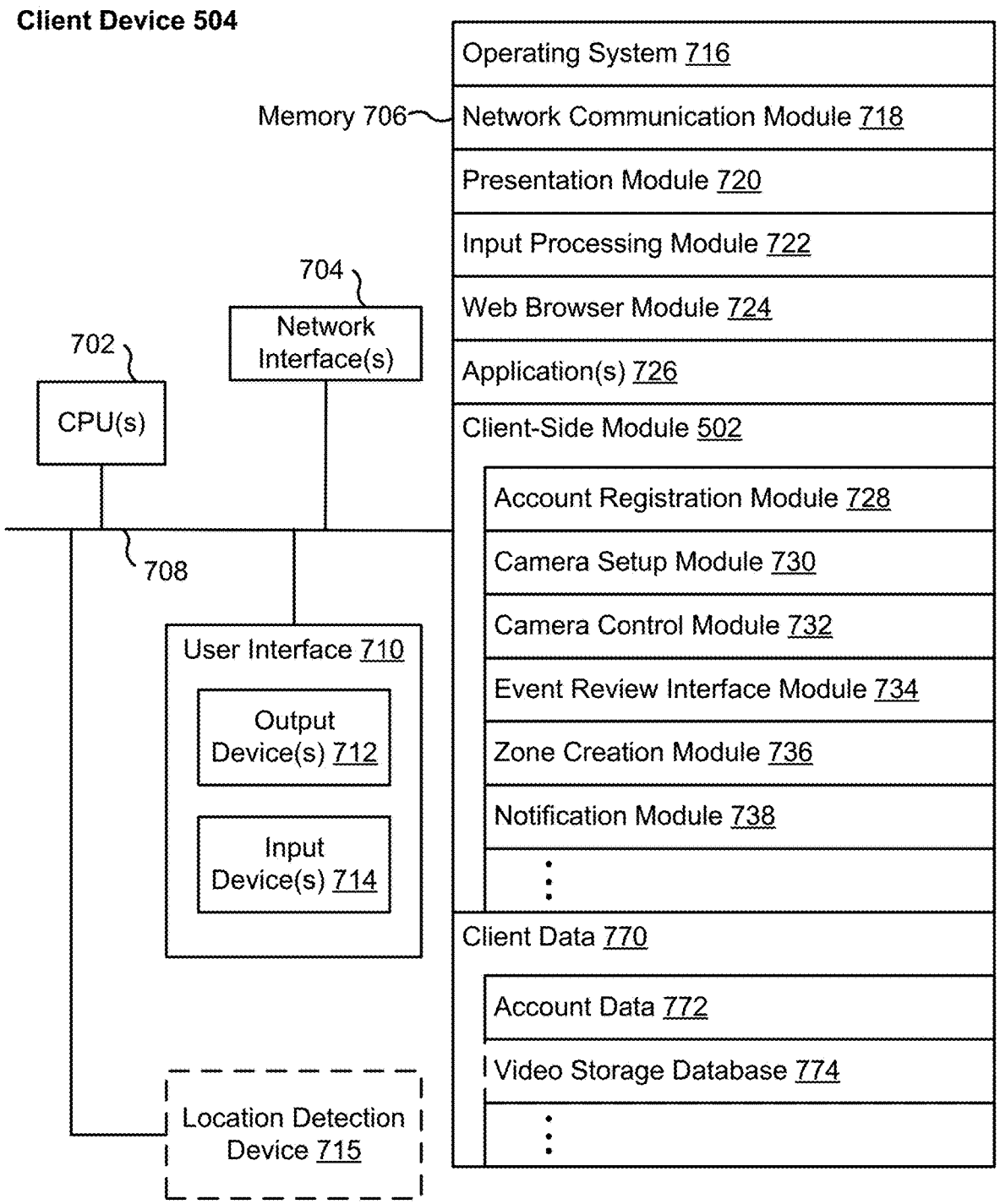
FIG. 7 is a block diagram illustrating a representative client device, in accordance with some implementations.

FIG. 7 is a block diagram illustrating a representative client device 504 associated with a reviewer account in accordance with some implementations. The client device 504, typically, includes one or more processing units (CPUs) 702, one or more network interfaces 704, memory 706, and one or more communication buses 708 for interconnecting these components (sometimes called a chipset). The client device 504 also includes a user interface 710. The user interface 710 includes one or more output devices 712 that enable presentation of media content, including one or more speakers and/or one or more visual displays. The user interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. In some implementations, the client device 504 includes one or more cameras, scanners, or photo sensor units for capturing images. In some implementations, the client device 504 optionally includes a location detection device 715, such as a GPS (global positioning satellite) or other geo-location receiver, for determining the location of the client device 504.

The memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 706, optionally, includes one or more storage devices remotely located from the one or more processing units 702. The memory 706, or alternatively the non-volatile memory within the memory 706, includes a non-transitory computer-readable storage medium. In some implementations, the memory 706, or the non-transitory computer-readable storage medium of memory 706, stores the following programs, modules, and data structures, or a subset or superset thereof:

Operating system 716 including procedures for handling various basic system services and for performing hardware dependent tasks;

Network communication module 718 for connecting the client device 504 to other computing devices (e.g., the video server system 508 and the video sources 522) connected to the one or more networks 162 via the one or more network interfaces 704 (wired or wireless);

Presentation module 720 for enabling presentation of information (e.g., user interfaces for application(s) 726 or the client-side module 502, widgets, websites and web pages thereof, and/or games, audio and/or video content, text, etc.) at the client device 504 via the one or more output devices 712 (e.g., displays, speakers, etc.) associated with the user interface 710 (e.g., user interfaces of FIGS. 10A-10E);

Input processing module 722 for detecting one or more user inputs or interactions from one of the one or more input devices 714 and interpreting the detected input or interaction;

Web browser module 724 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;

One or more applications 726 for execution by the client device 504 (e.g., games, social network applications, smart home applications, and/or other web or non-web based applications);

Client-side module 502, which provides client-side data processing and functionalities for monitoring and reviewing motion events detected in the video streams of one or more video sources, including but not limited to:

Account registration module 728 for establishing a reviewer account and registering one or more video sources with the video server system 508;

Camera setup module 730 for setting up one or more video sources within a local area network, and enabling the one or more video sources to access the video server system 508 on the Internet through the local area network;

Camera control module 732 for generating control commands for modifying an operating mode of the one or more video sources in accordance with user input;

Event review interface module 734 for providing user interfaces for selecting/defining regions of interest (e.g., region of interest 1006, FIG. 10B), reviewing event timelines, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;

Zone creation module 736 for providing a user interface for creating zones of interest for each video stream in accordance with user input, and sending the definitions of the zones of interest to the video server system 508; and Notification module 738 for generating real-time notifications for all or selected motion events on the client device 504 outside of the event review user interface; and client data 770 storing data associated with the reviewer account and the video sources 522, including, but is not limited to:

Account data 772 storing information related with the reviewer account, and the video sources, such as cached login credentials, camera characteristics, user interface settings, display preferences, etc.; and (optional) Video storage database 774 for storing raw/processed image data (e.g., streams 900 having various resolutions, frame rates, encoding characteristics, etc., FIG. 9) associated with each of the video sources 522 (each including one or more cameras 118) of each reviewer account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, the memory 706, optionally, stores additional modules and data structures not described above.

In some implementations, at least some of the functions of the video server system 508 are performed by the client device 504, and the corresponding sub-modules of these functions may be located within the client device 504 rather than the video server system 508. In some implementations, at least some of the functions of the client device 504 are performed by the video server system 508, and the corresponding sub-modules of these functions may be located within the video server system 508 rather than the client device 504. The client device 504 and the video server system 508 shown in FIGS. 6-7, respectively, are merely illustrative, and different configurations of the modules for implementing the functions described herein are possible in various implementations.

Figure 8:
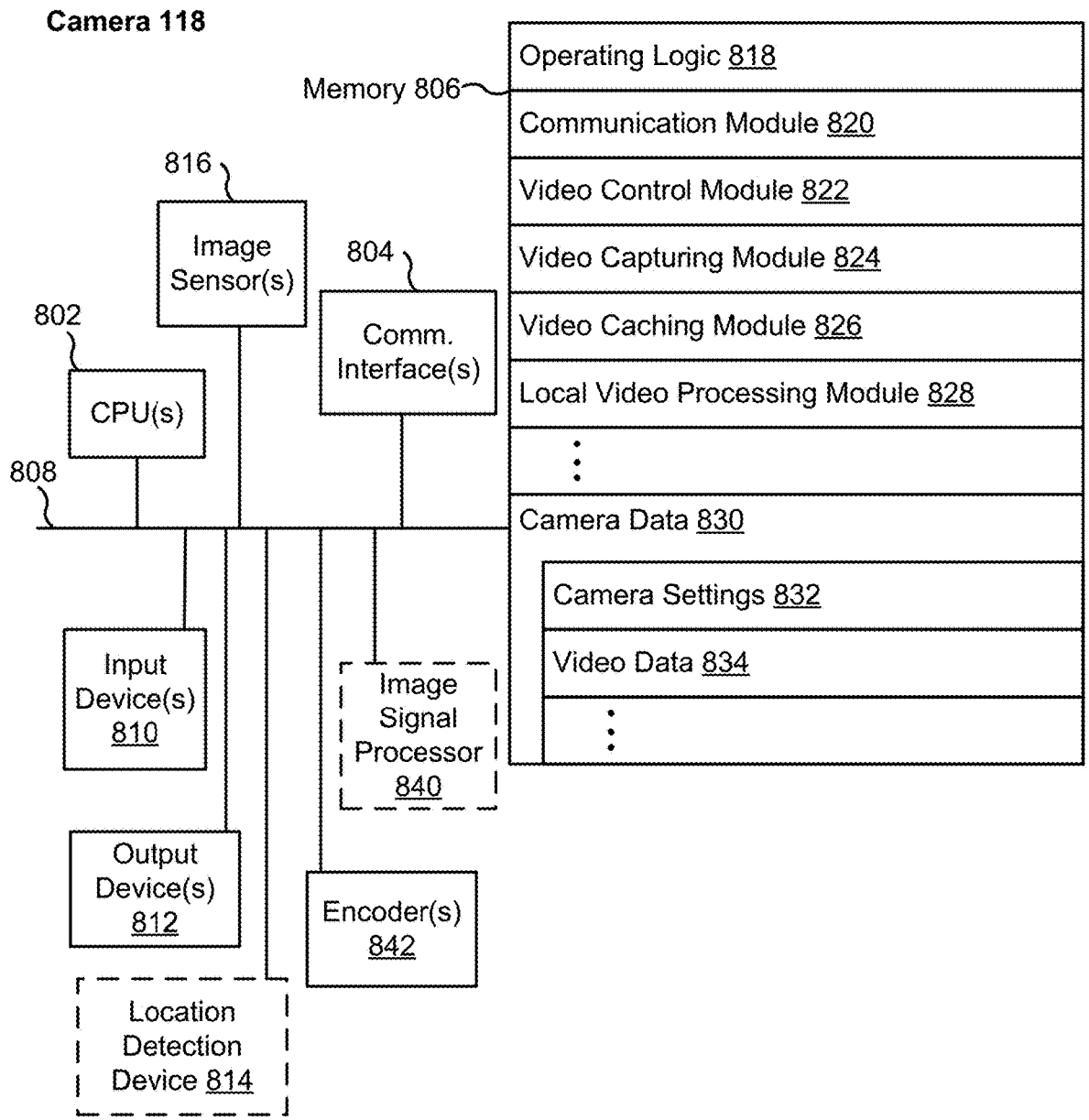
FIG. 8 is a block diagram illustrating a representative camera, in accordance with some implementations.

FIG. 8 is a block diagram illustrating a representative camera 118 in accordance with some implementations. In some implementations, the camera 118 includes one or more processing units (e.g., CPUs, ASICs, FPGAs, microprocessors, and the like) 802, one or more communication interfaces 804, memory 806, and one or more communication buses 808 for interconnecting these components (sometimes called a chipset). The camera 118 includes one or more image sensors 816 (e.g., an array of pixel sensors) for capturing raw image data. In some implementations, the camera 118 includes one or more input devices 810 such as one or more buttons for receiving input and one or more microphones. In some implementations, the camera 118 includes one or more output devices 812 such as one or more indicator lights, a sound card, a speaker, a small display for displaying textual information and error codes, etc. In some implementations, the camera 118 optionally includes a location detection device 814, such as a GPS (global positioning satellite) or other geo-location receiver, for determining the location of the camera 118.

In some implementations, the camera 118 includes an optional image signal processor (ISP) 840 configured to perform operations on the raw image data to modify characteristics of the captured image data (e.g., enhancing image quality). In some implementations, the camera 118 includes one or more encoders 842 configured to compress/encode raw or processed image data (e.g., raw image data captured by the image sensor 816, optionally processed image data output by the ISP 840, etc.). Both the ISP 840 and the encoders 842 are described in greater detail with respect to FIG. 9.

The memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 806, or alternatively the non-volatile memory within the memory 806, includes a non-transitory computer-readable storage medium. In some implementations, the memory 806, or the non-transitory computer-readable storage medium of the memory 806, stores the following programs, modules, and data structures, or a subset or superset thereof:

Operating system 818 including procedures for handling various basic system services and for performing hardware dependent tasks;

Network communication module 820 for connecting the camera 118 to other computing devices (e.g., the video server system 508, the client device 504, network routing devices, one or more controller devices, and networked storage devices) connected to the one or more networks 162 via the one or more communication interfaces 804 (wired or wireless);

Video control module 822 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 824 for capturing and generating video stream(s) (e.g., image sensor 816 capturing raw image data, encoders 842 generating streams 900 having various resolutions, frame rates, encoding characteristics, etc., FIG. 9) and sending the video stream(s) to the video server system 508 as a continuous feed or in short bursts;

Video caching module 826 for storing some or all captured video data locally at one or more local storage devices (e.g., memory, flash drives, internal hard disks, portable disks, etc.);

Local video processing module 828 for performing preliminary processing of the captured video data locally at the camera 118 (e.g., operations by the ISP 840, encoders 842, etc.), including for example, compressing and encrypting the captured video data for network transmission, image recognition (e.g., facial recognition), preliminary motion event detection, preliminary false positive suppression for motion event detection, preliminary motion vector generation, etc.; and Camera data 830 storing data, including but not limited to:
  Camera settings 832, including network settings, camera operation settings, camera storage settings, etc.; and
  Video data 834, including raw/processed image data (e.g., image data for streams 900 having various resolutions, frame rates, encoding characteristics, etc., FIG. 9) associated with each of the video sources 522 (each including one or more cameras 118) and/or motion vectors for detected motion event candidates to be sent to the video server system 508.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 806, optionally, stores a subset of the modules and data structures identified above. Furthermore, memory 806, optionally, stores additional modules and data structures not described above.

In some implementations, the functions of any of the devices and systems described herein (e.g., video server system 508, client device 504, camera 118, etc.) are interchangeable with one another and may be performed by any other devices or systems, where the corresponding sub-modules of these functions may additionally and/or alternatively be located within and executed by any of the devices and systems. For example, functions performed by the image data locator module 636 of the video server system 508 (e.g., locating image data for selected regions of interest) may be performed additionally and/or alternatively by the camera 118 (e.g., with respect to image data stored in the video storage database 514, camera data 830, etc.). The devices and systems shown in and described with respect to FIGS. 6-8 are merely illustrative, and different configurations of the modules for implementing the functions described herein are possible in various implementations.

FIG. 9 illustrates a representative video server system and a corresponding data processing pipeline for captured image data, in accordance with some implementations. A camera 118 (in addition to one or more other optional image/video capture devices in the same or a different device environment) captures image data of a scene using the image sensor 816. Captured image data is then processed by one or more encoders 842 (and optionally by the image signal processor (ISP) 840) to generate one or more processed data streams 900 (e.g., 900-1, 900-2, . . . 900-*n*). The generated data stream(s) 900 may then be transmitted to the video server system 508 for further processing (e.g., motion detection, event processing, etc.), storage, and/or distribution to devices for display. Any methods or processes described with respect to FIG. 9 may be performed additionally and/or alternatively to the implementations described with respect to the operating environment of FIG. 5.

Camera 118 captures unprocessed image data (i.e., raw image data) (e.g., image data has not been enhanced, not compressed/encoded in accordance with any encoding parameters, etc.). In some implementations, the camera 118 continuously captures raw image data substantially in real-time.

An optional image signal processor (ISP) 840 (or one or more modules thereof, not shown) performs one or more operations on the raw image data to modify characteristics of the captured image data (e.g., enhancing image quality). Examples of such operations include, but are not limited to: automatic exposure functions for providing capture of illuminance/color ranges by the image sensor 816; noise reduction techniques for improving signal-to-noise ratio (SNR); color processing techniques (e.g., white balance, color correction, gamma correction, or color conversion, etc.); and/or other image enhancement operations.

One or more encoders 842 employ coding techniques for compressing/encoding image data (e.g., the raw image data captured by the image sensor 816, the optionally processed image data output by the ISP 840, etc.). In some implementations, the encoder(s) 842 are used to convert, encode, or compress image data (e.g., raw or processed) into one or more image/video streams 900 (or image/video sub-streams) having respective pluralities of images or video frames. Each of the images/frames of the streams 900 have respective timestamps indicating times at which the images/frames were captured. While some streams 900 are video streams comprising successive frames of video, other streams 900 may comprise streams of images that are not successive frames of a video (e.g., images selectively captured in accordance with a predefined frequency, in response to control commands where motion has been detected by video server system 508, etc.).

In some implementations, encoder(s) 842 are configured to generate one or more streams 900 having respective image resolutions (e.g., 4K, 1080p, 720p, etc.) and frame rates (e.g., 30 frames per second). The encoder(s) 842 may also be configured to perform one or more operations for manipulating image characteristics of raw or processed image data (e.g., operations for scaling display resolution of image data, modifying aspect ratio, cropping/re-sizing field of view, etc.). In some implementations, the encoder(s) 842 are configured to encode raw or processed image data in accordance with one or more encoding parameters (e.g., defined by any variety of coding standards, such as MPEG, H.264, JPEG, etc.). In some implementations, the size of data for images/frames having a higher image resolution is larger than the size of data for images/frames having a smaller image resolution. In some implementations, the one or more streams 900 are distinct with respect to image resolution, frame rate, and/or other image/encoding characteristics (e.g., video sub-stream 900-2 has a framerate of 60 frames per second and images encoded at a 1080p resolution, while video sub-stream 900-2 has a framerate of 1 frame per second and images encoded at a 4K resolution).

In some implementations, any of the image data described above (e.g., raw image data, processed image data generated by any modules such as the ISP 840, encoders 842, etc.) is transmitted by the camera 118 to a remote device/system (e.g., video server system 508, client device 504, etc.) for storage. Additionally and/or alternatively, any of the image data described above is stored locally on the camera 118 (e.g., video data 834, FIG. 8).

The one or more streams 900 may be generated according to the implementations above by a single encoder (e.g., one encoder that outputs multiple streams/sub-streams of image/video data corresponding to different resolutions, frame rates, and/or other image/encoding characteristics). Alternatively, multiple encoders may be configured to generate respective streams/sub-streams based on the raw (or processed) image data (e.g., each encoder generates a stream having a respective resolution, frame rate, and/or other image/encoding characteristics).

In some implementations, one or more operations of the camera 118 are performed in accordance with control commands 902. For example, in some implementations, commencing or ceasing capture of image data by the image sensor 816 is performed in response to control commands 902 (e.g., generation of a stream 900 is initiated in response to detected motion in the scene). In some implementations, streams 900 are generated in accordance with received control commands 902 that specify one or more parameters (e.g., stream resolution, stream frame rate, encoding parameters, instructions for manipulating/modifying raw or processed image data, etc.). Control commands 902 may be generated locally (e.g., at the camera 118) or received from one or more devices or systems (e.g., received from video server system 508, client device 504, etc.).

While some streams 900 are continuously transmitted to devices or systems (e.g., to video server system 508, which is then provided to client device 504 for review, etc.), other streams 900 (or frames/images of the streams) are transmitted in accordance with a predefined frequency (e.g., transmit frame(s) once every minute). In some implementations, streams 900 (or frames/images of the streams) are transmitted in response to receiving one or more control commands 902 (e.g., video server system 508 provides a control command 902 to camera 118 in response to detecting motion in the scene, and a frame of stream 900 is transmitted to video server system 508 in response to receiving the control command).

In some implementations, the video server system 508 performs data processing for event monitoring and motion detection on one or more streams 900 received from the camera 118. Additionally and/or alternatively, event monitoring and motion detection are performed locally at the camera 118.

Although not shown, in some implementations, the camera 118 (or the components thereof, such as the ISP 840, encoders 842, etc.) includes one or more additional modules for performing additional operations on raw or processed image data. Furthermore, operations performed by any of the modules or components described above may be performed by one or more separate modules not shown.

Attention is now directed towards implementations of user interfaces and associated processes that may be implemented on a respective client device 504 with one or more speakers enabled to output sound, zero or more microphones enabled to receive sound input, and a touch screen enabled to receive one or more contacts and display information (e.g., media content, webpages and/or user interfaces for an application). FIGS. 10A-10E illustrate example user interfaces for facilitating review of captured image data in accordance with some implementations.

Although some of the examples that follow will be given with reference to inputs on touch screen (where the touch sensitive surface and the display are combined), in some implementations, the device detects inputs on a touch-sensitive surface that is separate from the display. In some implementations, the touch sensitive surface has a primary axis that corresponds to a primary axis on the display. In accordance with these implementations, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some implementations, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 10A:
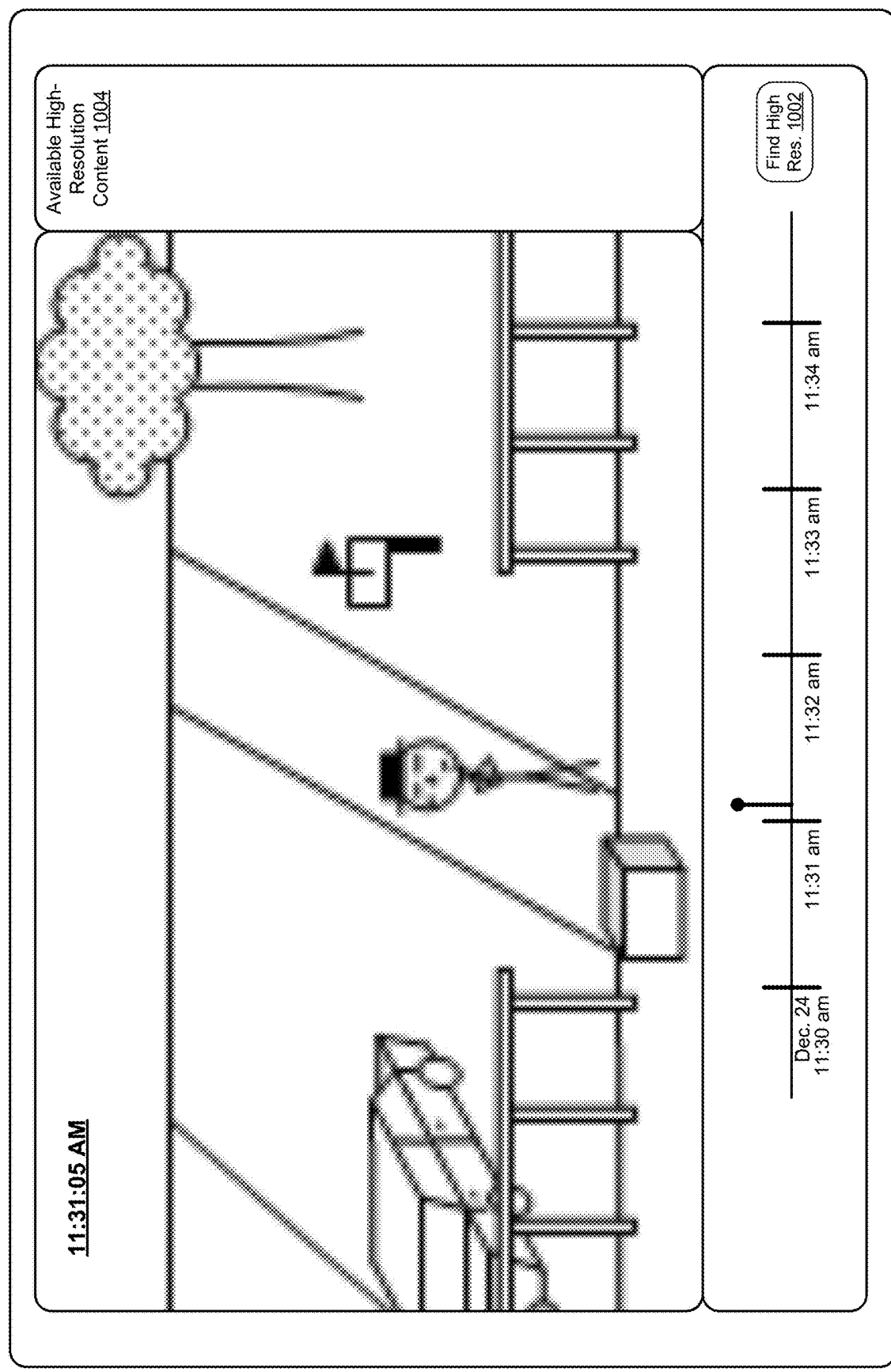
FIGS. 10A-10E illustrate example user interfaces for facilitating review of captured image data, in accordance with some implementations.

Referring to FIG. 10A, playback of video streams/sub-streams is presented on the client device 504 (e.g., streams 900 generated by a camera 118 are transmitted to video server system 508, at least some of which are thereafter transmitted to client device 504 for display, FIG. 9). In this example, a first video sub-stream comprising images of a scene is played on the client device 504. The first video sub-stream has a first image resolution and a first frame rate (e.g., stream 900-2 comprising images having a 1080p image resolution and a frame rate of 60 frames per second). In particular, a frame of the first video sub-stream is displayed, having a corresponding timestamp of 11:31:05 AM.

Figure 10B:
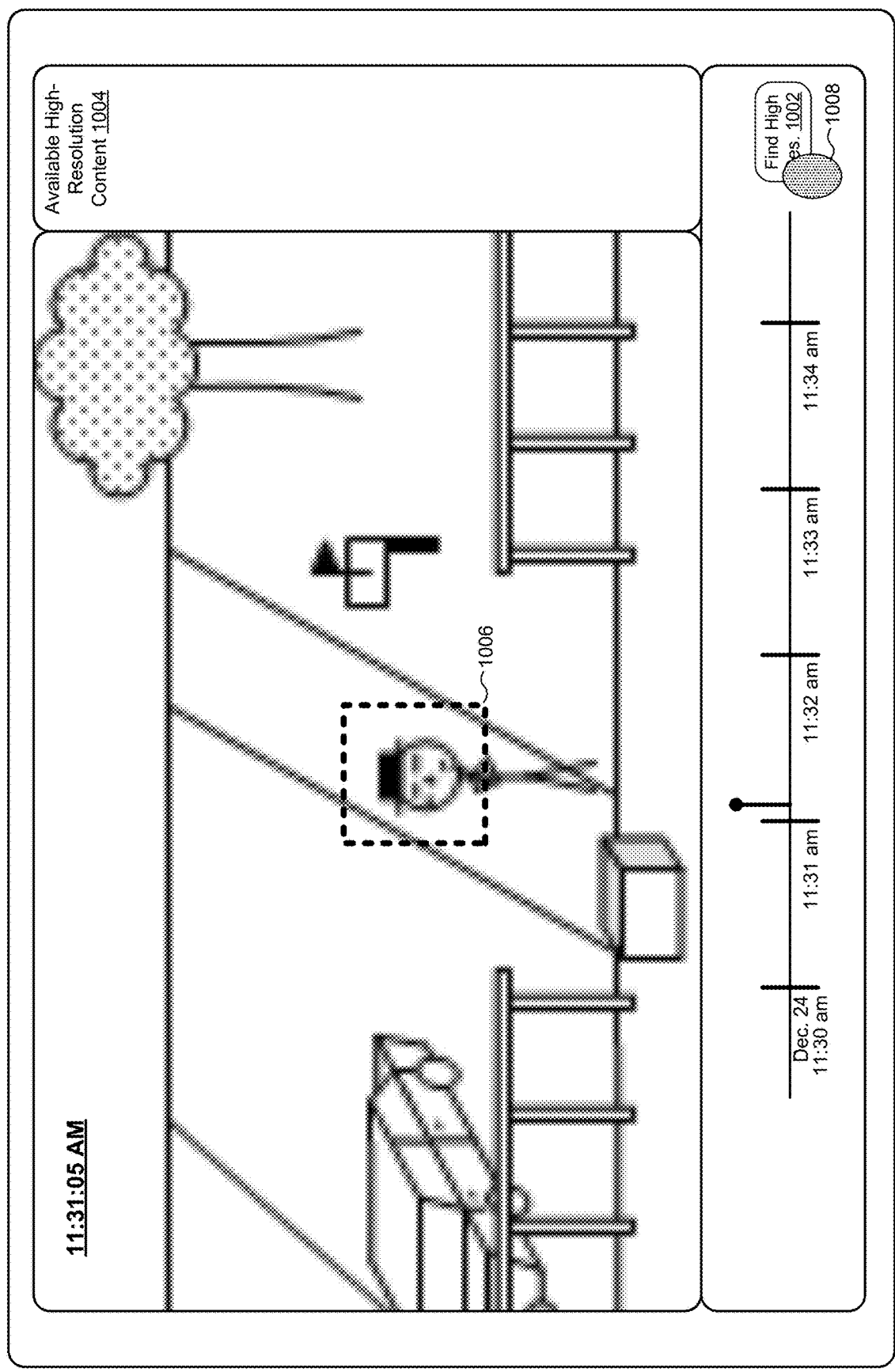

Referring now to FIG. 10B, in addition to reviewing playback of video streams, a user may locate higher-resolution image data (and/or image data of the same or lower resolutions) for a selected region of interest within the scene. Here, facial details of a suspicious individual in the recording are difficult to discern given the resolution of the first video sub-stream presented. A user may therefore wish to locate other higher-resolution image or video data including the same individual corresponding to a time either before or after a timestamp of the currently viewed frame.

To do so, a user may select a region of interest (e.g., by using a touch gesture to select a specific portion of the scene) and locate available higher-resolution image data that includes the region of interest. In this example, a region of interest 1006 is defined around the individual's facial region, and a user input 1008 is detected on the affordance 1002 causing higher-resolution image data for the selected region of interest to be located. For example, in some implementations, in response to detecting selection of a region of interest, instructions are sent from the client device 504 to the device(s)/system(s) that store and distribute the streams

900 (e.g., video server system 508) to locate one or more images/frames from one or more video streams that have a higher image resolution (than images of the video stream from which the region of interest is selected).

Figure 10C:
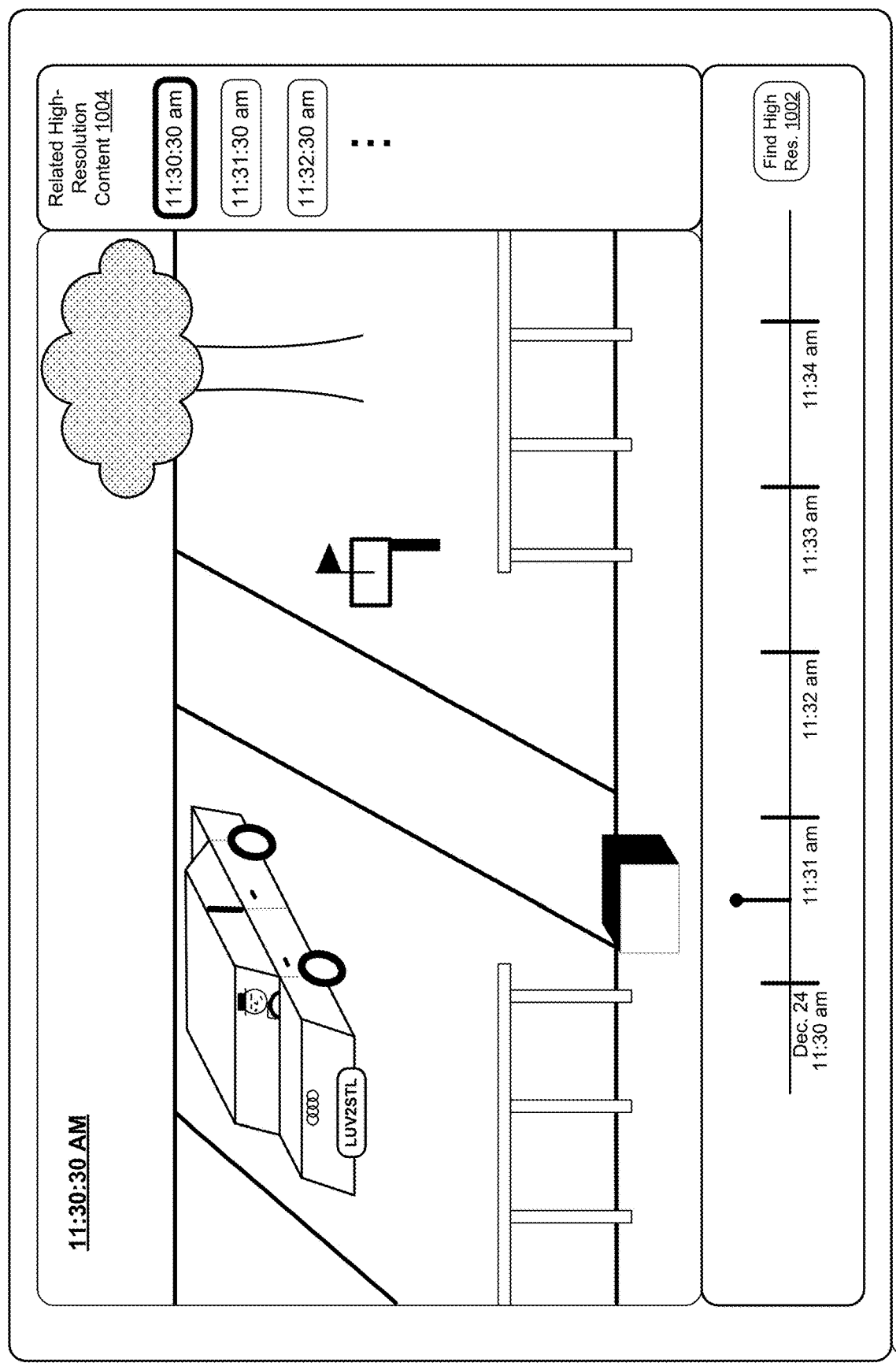

Referring now to FIG. 10C and continuing the example above, higher resolution image data of the selected region of interest is located and presented. A list of located images that include the region of interest is presented in section 1004 (shown as optional selectable affordances). Each of the located images has a corresponding timestamp. In this example, the located images are frames of a second video sub-stream having a higher image resolution (e.g., stream 900-1, 4K image resolution, FIG. 9) than the first video sub-stream (e.g., stream 900-2, 1080p). In some implementations, located images correspond to image data from multiple video sub-streams having a higher image resolution than the first video sub-stream (e.g., list includes located images of a 1080p resolution and 4K resolution).

The frame shown in FIG. 10C corresponds to a timestamp of 11:30:30 AM, including image data of the region of interest for a time prior to the frame displayed in FIGS. 10A and 10B. It is apparent from the illustrated example that the frame displayed in FIG. 10C has a higher resolution than the frame displayed in FIG. 10B. Here, details of the selected region of interest are clearer and can be easily discerned. From the located image data, other information that may have been obscured from a lower-resolution sub-stream can also be identified, such as the license plate and make of a vehicle associated with the suspicious individual.

Figure 10D:
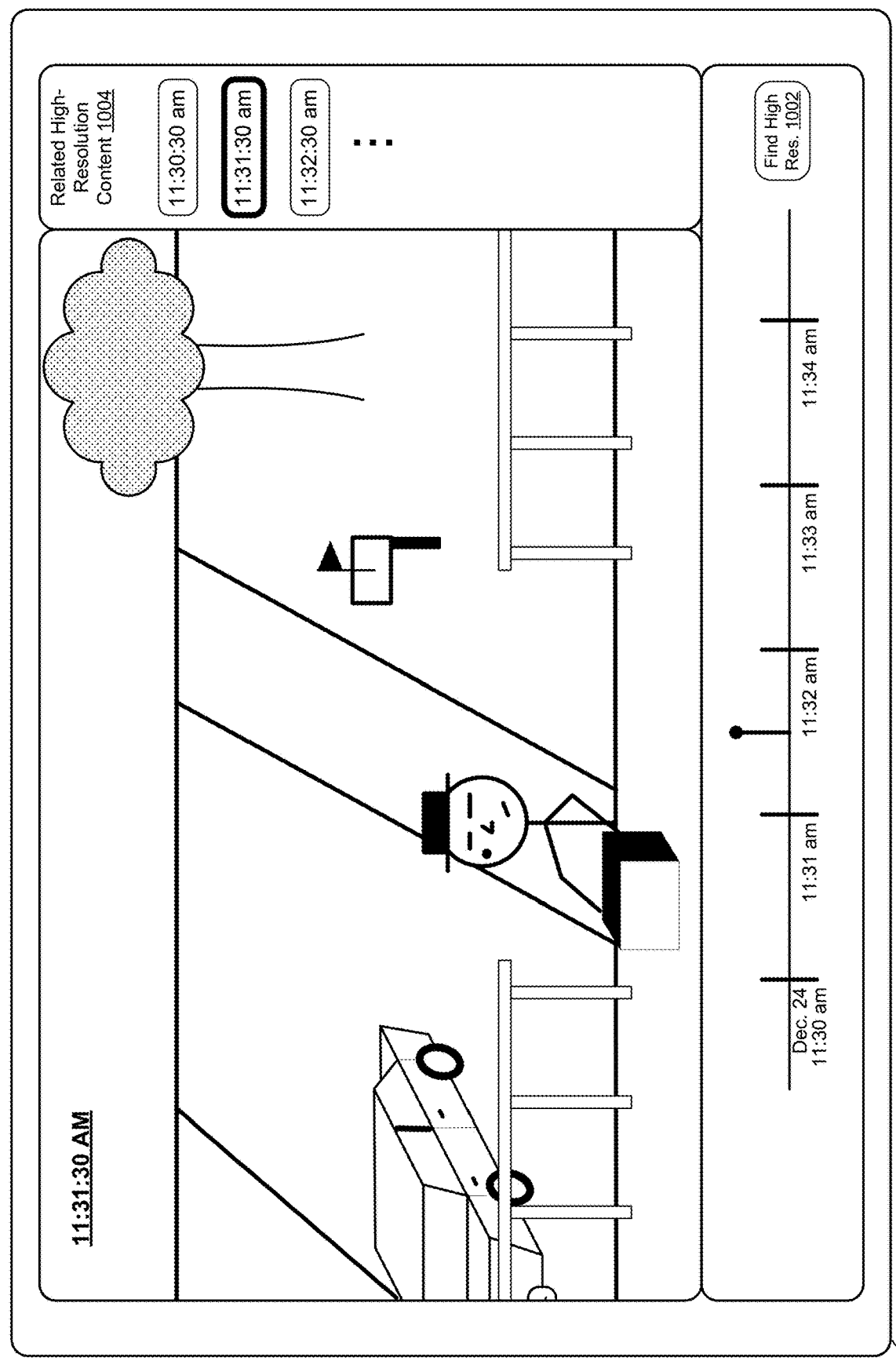
Figure 10E:
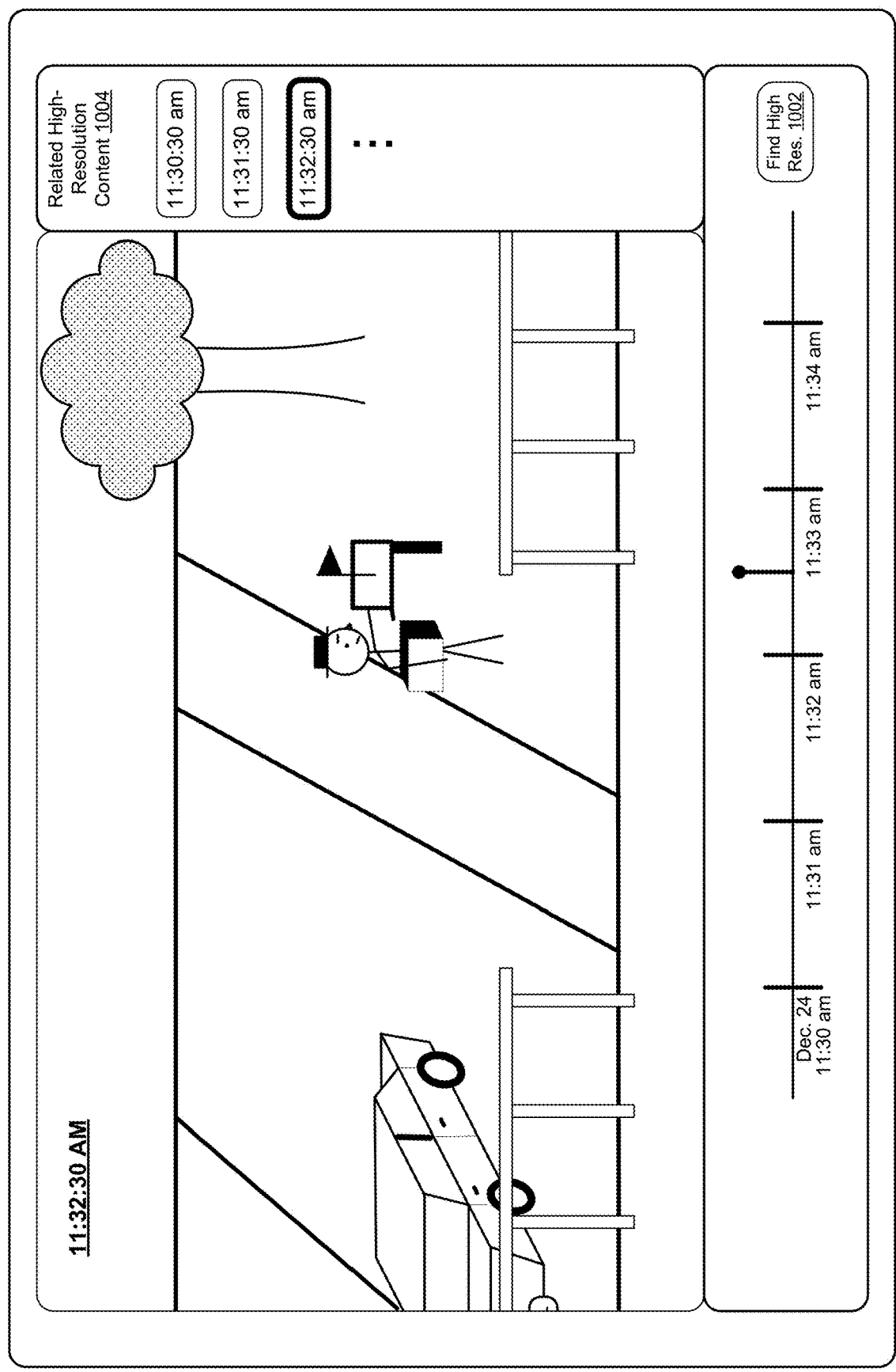

FIGS. 10D and 10E show additional examples of higher resolution image data that include the region of interest, particularly images that show the facial region of the suspicious individual. In these examples, the second video sub-stream (which includes the higher resolution image data shown) has a lower framerate than the first video sub-stream. Here, one frame of higher resolution image data is available for each minute (e.g., 11:30:30 AM, 11:31:30 AM, 11:32:30 AM, . . . ). As described previously and in greater detail below (with respect to the method 1100), images/frames of higher resolution streams are larger in data size, often requiring greater bandwidth consumption and processing power. Accordingly, some streams 900 are configured (e.g., while compressing/encoding raw image data) to have a lower frame rate so as enable the coordinated (e.g., simultaneous, concurrent, staggered, etc.) transmission of multiple streams 900 of varying resolutions to a storage system or display device within given bandwidth constraints.

Various implementations with respect to locating image data of a region of interest are described in greater detail with respect to FIG. 10A-10E.

Figure 11:
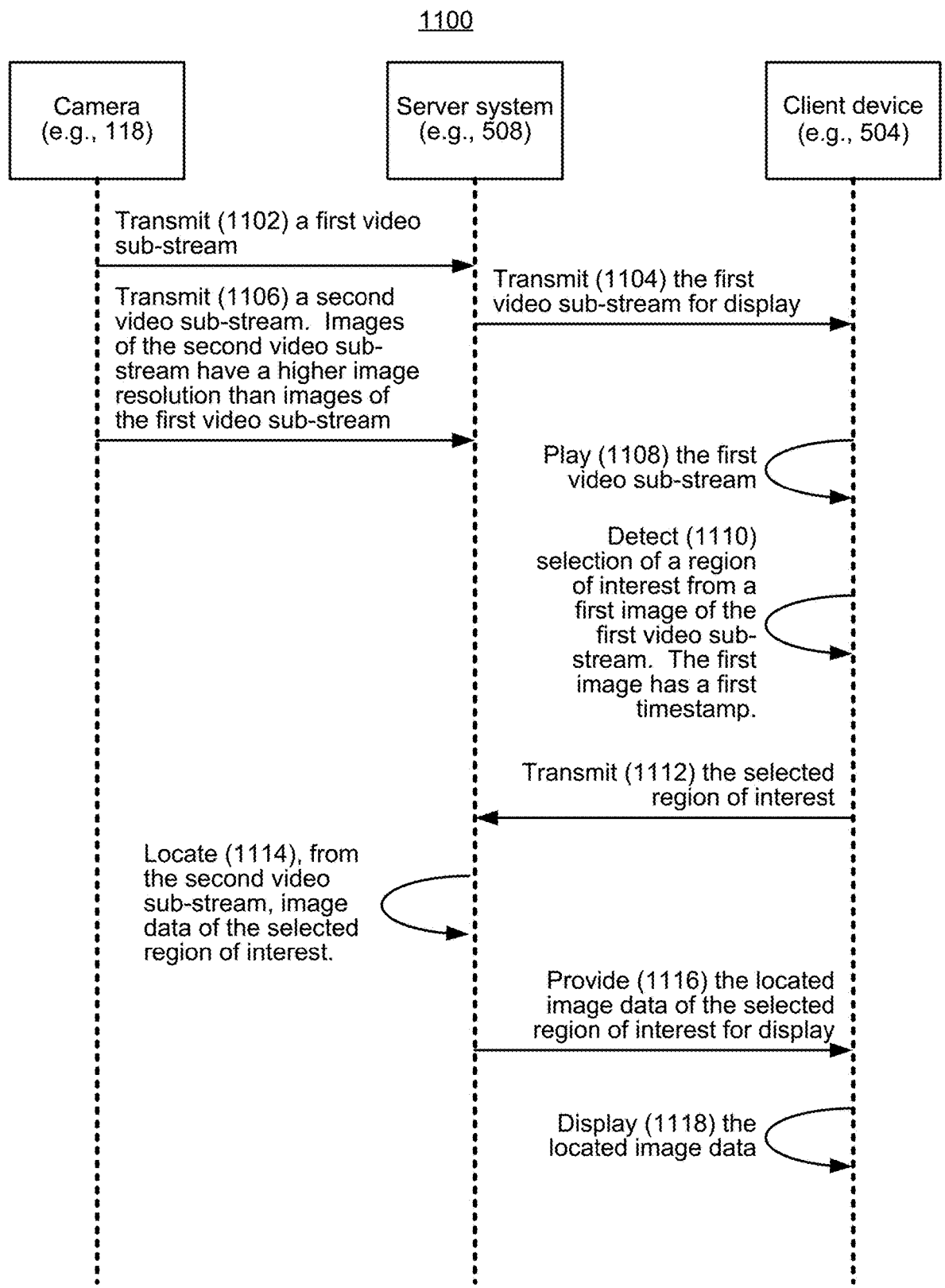
FIG. 11 illustrates a flowchart representation of a method of locating image data for selected regions of interest, in accordance with some implementations.

FIG. 11 illustrates a flowchart representation of a method 1100 of locating image data for selected regions of interest, in accordance with some implementations. In some implementations, the method 1100 is performed by one or more electronic devices of one or more systems (e.g., devices of a smart home environment 100 in FIGS. 1-9, such as a camera 118, client device 504, etc.) and/or a server system (e.g., video server system 508). Thus, in some implementations, the operations of the method 1100 described herein are interchangeable, and respective operations of the method 1100 are performed by any of the aforementioned devices, systems, or combination of devices and/or systems. As merely an example, in some implementations, a camera (rather than a server system) receives a selected region of interest from a client device, and the camera (rather than the server system) performs operations for locating image data of the selected region of interest (step 1114) from a high-resolution second video sub-stream.

The method 1100 is performed by a camera (e.g., camera 118, FIGS. 1 and 8), a server system (e.g., video server system 508, FIGS. 1 and 6), and/or a client device (e.g., client device 504, FIGS. 1 and 7). Operations performed in FIG. 11 correspond to instructions stored in computer memories (e.g., memory 806 of camera 118, FIG. 8, memory 606 of video server system 508, FIG. 6, memory 706 of client device 504, FIG. 7, etc.) or other computer-readable storage medium.

The camera transmits (1102) to the server system (and the server system obtains from the camera) a first video sub-stream comprising a first plurality of images of a scene. Referring to FIG. 9, for example, the video server system 508 receives from the camera 118 over network 162 (and stores in a storage database, such as video storage database 514, FIG. 6) a stream 900-2 that has an image resolution of 1080p.

The camera transmits (1106) to the server system (and the server system obtains from the camera) a second video sub-stream comprising a second plurality of images of at least a portion of the scene. Images of the second video sub-stream have a higher image resolution than images of the first video sub-stream (e.g., in addition to the stream 900-2, the video server system 508 receives, from the camera 118 over network 162, a stream 900-1 that has a 4K image resolution, FIG. 9). The first video sub-stream and the second video sub-stream may be transmitted in parallel (e.g., concurrently).

In some implementations, the second video sub-stream corresponds to a lower frame rate than a respective frame rate of the first video sub-stream (e.g., stream 900-2 has a frame rate of 60 fps, while stream 900-1 has a framerate of 1 fps). In some implementations, the server system obtains (i.e., the camera transmits) the second video sub-stream at a lower frequency than a frequency at which it obtains the first video sub-stream. As an example, images/frames of the first video sub-stream are continuously streamed to the video server system 508, while images/frames of the second video sub-stream are transmitted to the video server system 508 once every minute. Such implementations conserve data transmission and processing bandwidth.

In some implementations, the first video sub-stream and the second video sub-stream correspond to the same content recorded by a camera (e.g., camera 118, FIG. 9). In other words, images for the first and second video sub-streams capture image data for substantially the same scene during overlapping periods of time, but at different resolutions (and/or frame rates). In some implementations, the second plurality of images includes images for a portion of the entire scene (e.g., first and second sub-streams only partially overlap with respect to field of view of the scene). In some implementations, the camera captures a raw video stream that is further processed into the first and second video sub-streams (e.g., image sensor 816 captures raw image data and the encoders 842 convert the raw image data into one or more streams 900 of varying resolution, as described with respect to FIG. 9). In some implementations, the first and second sub-streams are distinct video streams that are captured in parallel/concurrently (e.g., using multiple image sensors 816 in a single camera 118, FIG. 8). In some implementations, the first and second sub-streams are obtained from different cameras configured to monitor the same scene (or optionally different parts of the same scene) and generate image/video sub-streams having respective resolutions.

The server system transmits (1104) to the client device (and the client device receives from the server system) the first video sub-stream for display, and the client device plays (1108) the received first video sub-stream (e.g., video server system 508 transmits stream 900-2 to the client device 504 for playback, FIG. 10A).

The client device detects (1110) selection of a region of interest from a first image of the first video sub-stream. The first image has a first timestamp. In some implementations, selection of the region of interest is detected during playback of the first video sub-stream. In some implementations, playing the first video sub-stream includes displaying the first image, and selection of the region of interest is detected while displaying the first image (e.g., while the first video sub-stream is paused, a region of interest 1006 is selected from the displayed image having a timestamp of 11:31:05 AM, FIG. 10B). The client device transmits (1112) to the server system (and the server system receives from the client device) the selected region of interest.

In some implementations, the selected region of interest in the scene corresponds to a facial region of an individual (e.g., region of interest 1006, FIG. 10B). The selected region of interest may be an object/individual (e.g., in motion), a cluster of associated objects/individuals (e.g., group of individuals interacting), an event of interest (e.g., a hazard event), and/or a zone of interest (e.g., fixed portion of a full-frame of a capture device that is user-defined or automatically defined). In some implementations, the selected region of interest corresponds to a part of the scene associated with detected motion (e.g., detected movement of an object/individual, location in the scene in which motion is detected, etc.).

In some implementations, detecting selection of the region of interest comprises detecting a user input defining a boundary of the region of interest (e.g., a drag touch gesture that defines region of interest 1006, FIG. 10B). In some implementations, the first image is a full-frame image, and the selected region of interest corresponds to a portion of the first image (e.g., user-defined region of interest 1006 is a portion of the frame displayed, FIG. 10B). In some implementations, the portion of the first image is a zoomed portion. For instance, the field of view shown in FIG. 10B may be shrunk (e.g., in response to a user input for zooming into a portion of the frame), and the resulting field of view is defined as the selected region of interest to be used for locating higher-resolution image data).

The server system locates (1114), from the second plurality of images of the second video sub-stream, image data of the selected region of interest based on the first timestamp. That is, the located image data of the selected region of interest has a higher resolution than images of the first video sub-stream. In some implementations, the server system locates image data of the selected region of interest from one or more additional video sub-streams that have a higher image resolution than the first video sub-stream (e.g., the first video sub-stream has an image resolution of 720p, and image data is located from video sub-streams having image resolutions of 1080p and 4K). Additionally and/or alternatively, the server system locates image data of the selected region of interest from one or more video sub-streams that have a lower image resolution than the first video sub-stream.

In some implementations, the located image data of the selected region of interest corresponds to one or more images of the second video sub-stream having respective timestamps (e.g., images of stream 900-1 shown in FIGS. 10C through 10E having corresponding timestamps 11:30: 30 AM, 11:31:30 AM, 11:32:30 AM). In some implementations, the one or more images comprise multiple images that are not successive frames of a video segment of the second video sub-stream (e.g., images of stream 900-1 shown in FIGS. 10C through 10E are individual images captured one minute apart, rather than frames of a continuous video segments). In other words, the located image data does not include or form a continuous/sequential video clip, and instead includes a collection of different frames spaced apart from each other by different (or equal) time intervals. In some implementations, the located image data includes images from different times of the day (e.g., morning, afternoon, evening, etc.) In some implementations, the one or more images comprise multiple images that together compose a video segment of the second video sub-stream (e.g., the video segment corresponds to a continuous sequence of frames of the second video sub-stream). In some implementations, the located image data (of the second video sub-stream) includes one or more video segments and images that are not successive frames of a video segment (e.g., individual frames).

In some implementations, the one or more images comprise multiple images having respective timestamps preceding and following the first timestamp of the first image (e.g., the image shown in FIG. 10C precedes, and the image shown in FIG. 10D follows, the timestamp of the image shown in FIG. 10B). In other words, the one or more located images correspond to times before and after the first image (from which the region of interest is selected).

In some implementations, the located image data of the selected region of interest includes image data having a respective timestamp that is closest in time to the first timestamp (e.g., in response to the user input 1008 in FIG. 10B, the frame shown in FIG. 10D is located and displayed since it is closest in time to the 11:31:05 AM timestamp). That is, of images of the second video sub-stream that include the selected region of interest, the server system locates and retrieves an image/video segment that is closest in time to the first timestamp (or alternatively, the server system locates a predefined/specified number of images/ video segments that are closest in time to the first timestamp). In some cases, the image data closest in time includes multiple images/video segments (e.g., two images equally close to the first timestamp, such as one image with a timestamp a minute before and another image with a timestamp a minute after the first timestamp; two images having the same timestamp, but different resolutions (frames from different high-resolution sub-streams); etc.).

In some implementations, the respective timestamp of the located image data matches the first timestamp (i.e., a higher resolution version of the first image is located and displayed). In some implementations, locating the image data includes locating one or more images having respective timestamps that do not correspond to the first timestamp (i.e., locating images that correspond to a different time than the first image).

In some implementations, the located image data includes one or more images (or video segments) whose timestamps are within a predefined (e.g., user-defined) period of time from the first timestamp. For example, referring to the example in FIG. 10B, the server system locates images/ video segments having timestamps within 2 minutes of 11:31:05 AM (e.g., image data from the second sub-stream that include the selected region of interest and are between 11:29:05 AM and 11:32:05 AM).

Additionally and/or alternatively, locating the image data of the selected region of interest may be performed using other identifiers for images of the video sub-streams that indicate a relative time at which those images were captured (e.g., frame numbers, unique identifiers, etc.).

In some implementations, the located image data includes at least a portion of the selected region of interest (e.g., for a selected region of interest that includes a full-body view of an individual, the located image data includes one or more images that include at least a facial region of the individual). In some implementations, the selected region of interest includes multiple individuals/objects in the scene, and the located image data includes some (i.e., less than all) or all of the selected individuals/objects.

In some implementations, the located image data includes image data for one or more portions, of the one or more images, that correspond to the selected region of interest. In these implementations, rather than providing full-frame images, cropped portions corresponding to the region of interest are provided (e.g., portions of frames that include only the selected facial region of an individual).

In some implementations, locating the image data of the selected region of interest is further based on criteria for one or more of: image quality, scene location, and features of the region of interest. Image quality may be defined by one or more quality metrics (e.g., specified resolution, image blurring, signal-to-noise ratio, etc.). Scene location corresponds to a predefined location, zone, or portion of the scene or frame (e.g., top-right quadrant, bottom half, etc.), which can be used to filter out only those images/frames in which the selected region of interest (e.g., a suspicious individual) appears in the defined scene location. Features of the region of interest may be physical characteristics (e.g., size, shape, type, etc.) or motion characteristics (e.g., speed, direction, etc.) describing an object (e.g., in motion, stationary, etc.).

In some implementations, locating the image data of the selected region of interest is performed using one or more image recognition operations, the located image data satisfying a predefined similarity criterion with respect to image data for the selected region of interest in the first image (e.g., threshold number of matching features of the region of interest, percentage by which compared features of the region of interest overlap, etc.).

In some implementations, locating the image data of the selected region of interest includes identifying an object within the selected region of interest and obtaining a respective motion vector for the identified object. Using the respective motion vector, image data from the second video sub-stream is identified that includes the identified object, the identified image data having a respective timestamp that is distinct from the first timestamp. Motion vectors may be used alternatively and/or in addition to image recognition techniques discussed above. For example, rather than scanning the second sub-stream to locate an object using image recognition, a motion vector may be combined with a known position of an identified object (e.g., in a lower-resolution stream) to extrapolate locations of the object in other frames of a video. The determined locations of the object in those other frames may then be used to identify image data from a higher-resolution video sub-stream.

The server system provides (1116) to the client device (and the client device receives from the server system) the located image data of the selected region of interest for display (e.g., images of stream 900-1 shown in FIGS. 10C through 10E are provided for display and review). The client device then displays (1118) the located image data. In some implementations, the client device ceases playback of the first video sub-stream in response to receiving the image located data, wherein displaying the located image data is performed in response to receiving the located image data (e.g., the client device 504 transitions to displaying the located image data between FIGS. 10B and 10C).

In some implementations, the client device displays one or more affordances corresponding to the located image data (e.g., selectable affordances and corresponding timestamps in section 1004, FIG. 10C). The client device then detects a user input selecting a first one of the one or more affordances, wherein the located image data is displayed in response to detecting selection of the first affordance (e.g., in response to a user input selecting the located image data corresponding to timestamp 11:30:30 AM, displaying the image shown in FIG. 10C).

In some implementations, providing (1116) the located image data (and/or displaying (1118) the located image data) comprises overlaying the located image data of the selected region of interest with the first image of the first video sub-stream to form a composite image (e.g., overlaying located higher-resolution image data for a facial region over a corresponding position in a lower-resolution frame). The composite image is then provided to the client device for display.

In some implementations, providing the located image data includes providing to the client device (and displaying the located image data includes executing, by the client device) a command for commencing playback of the second video sub-stream from a position within the second sub-stream that corresponds to the located image data. In some implementations, playback of the first video sub-stream commences from a position corresponding to a timestamp of the located image data (e.g., a timestamp of a located higher-resolution image/video segment). Therefore, as an example, users may view located image data from a high-resolution video sub-stream having a lower framerate. However, the high-resolution video sub-stream may not include video segments (i.e., non-successive frames) for review. As an alternative, users may resort to viewing a video segment from the first video stream (i.e., lower-resolution stream), where the video segment corresponds to the timestamp of the high-resolution image.

As described above, operations of the method 1100 described herein are interchangeable, and respective operations of the method 1100 may be performed by any of the aforementioned devices, systems, or combination of devices and/or systems. As an example, in some implementations, the camera performs any or all of the operations described with respect to the server system, such as transmitting (step 1112) the first video sub-stream directly to the client device, and locating (step 1114) image data for a selected region of interest received directly from the client device. Therefore, any operations performed between the client device and server system, and between the server system and client device, may be performed analogously between the camera and the client device.

It should be understood that the particular order in which the operations in FIG. 11 have been described is merely an example and is not intended to indicate that the described order is the only order in which the operations could be performed. One of ordinary skill in the art would recognize various ways to reorder the operations described herein.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

Reference has been made in detail to implementations, examples of which are illustrated in the accompanying drawings. In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first sub-stream could be termed a second sub-stream, and, similarly, a second sub-stream could be termed a first sub-stream, without departing from the scope of the various described implementations. The first sub-stream and the second sub-stream are both sub-streams, but they are not the same sub-stream.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a client device having one or more processors and memory storing instructions for execution by the one or more processors:
receiving, from a server system, a first video sub-stream comprising a first plurality of images of a scene;
playing the first video sub-stream;
detecting selection of a region of interest in the scene, wherein the selection is from a first image of the first plurality of images of the first video sub-stream;
transmitting the selected region of interest to the server system;
receiving, from the server system, image data of the selected region of interest, wherein the image data is located from a second plurality of images of a second video sub-stream corresponding to the first video sub-stream, images of the second video sub-stream having a higher image resolution than images of the first video sub-stream; and
displaying the located image data.

2. The method of claim 1, wherein the first video sub-stream and the second video sub-stream correspond to the same content recorded by a camera device.

3. The method of claim 1, wherein the second video sub-stream corresponds to a lower frame rate than a respective frame rate of the first video sub-stream.

4. The method of claim 1, wherein the selected region of interest in the scene corresponds to a facial region of an individual.

5. The method of claim 1, wherein the first image is a full-frame image, and the selected region of interest corresponds to a portion of the first image.

6. The method of claim 5, wherein the portion of the first image is a zoomed portion.

7. The method of claim 1, wherein the located image data of the selected region of interest corresponds to one or more images of the second video sub-stream having respective timestamps.

8. The method of claim 7, wherein the one or more images comprise multiple images that are not successive frames of a video segment of the second video sub-stream.

9. The method of claim 7, wherein the one or more images comprise multiple images having respective timestamps preceding and following a first timestamp of the first image.

10. The method of claim 7, wherein the one or more images comprise multiple images that together compose a video segment of the second video sub-stream.

11. The method of claim 7, wherein the located image data includes image data for one or more portions, of the one or more images, that correspond to the selected region of interest.

12. A non-transitory computer-readable storage medium, storing one or more programs for execution by one or more processors of a client device, the one or more programs including instructions for:
  receiving, from a server system, a first video sub-stream comprising a first plurality of images of a scene;
  playing the first video sub-stream;
  detecting selection of a region of interest in the scene, wherein the selection is from a first image of the first plurality of images of the first video sub-stream;
  transmitting the selected region of interest to the server system;
  receiving, from the server system, image data of the selected region of interest, wherein the image data is located from a second plurality of images of a second video sub-stream corresponding to the first video sub-stream, images of the second video sub-stream having a higher image resolution than images of the first video sub-stream; and
  displaying the located image data.

13. The computer-readable storage medium of claim 12, wherein the located image data of the selected region of interest includes image data having a respective timestamp that is closest in time to a first timestamp of the first image.

14. The computer-readable storage medium of claim 13, wherein the respective timestamp of the located image data matches the first timestamp of the first image.

15. The computer-readable storage medium of claim 12, wherein displaying the located image data comprises displaying, at the client device, a command for commencing playback of the second video sub-stream from a position within the second sub-stream that corresponds to the located image data.

16. The computer-readable storage medium of claim 12, wherein locating the image data of the selected region of interest is further based on criteria for one or more of: image sharpness, scene location, and features of the region of interest.

17. The computer-readable storage medium of claim 12, wherein:
  playing the first video sub-stream comprises displaying the first image; and
  selection of the region of interest is detected while displaying the first image.

18. The computer-readable storage medium of claim 12, wherein the one or more programs further include instructions for:
  displaying one or more affordances corresponding to the located image data; and
  detecting a user input selecting a first one of the one or more affordances, wherein the located image data is displayed in response to detecting selection of the first affordance.

19. The computer-readable storage medium of claim 12, wherein detecting selection of the region of interest comprises detecting a user input defining a boundary of the region of interest.

20. The computer-readable storage medium of claim 12, wherein the one or more programs further include instructions for ceasing playback of the first video sub-stream in response to receiving the located image data, wherein displaying the located image data is performed in response to receiving the located image data.

* * * * *